March 10, 1925.

C. H. LEINERT

VALVE FOR COMPRESSORS

Filed Nov. 9, 1921

Inventor:
Charles H. Leinert
By Banning & Banning
Attys.

March 10, 1925.
C. H. LEINERT
1,529,439
VALVE FOR COMPRESSORS
Filed Nov. 9, 1921
2 Sheets-Sheet 2
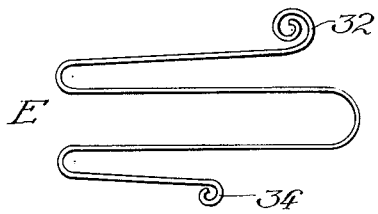
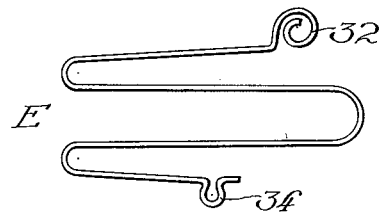
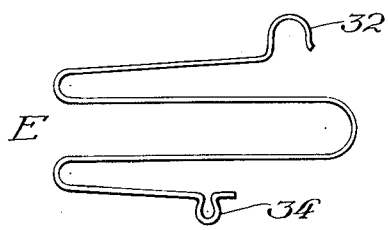
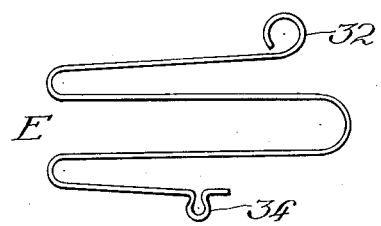
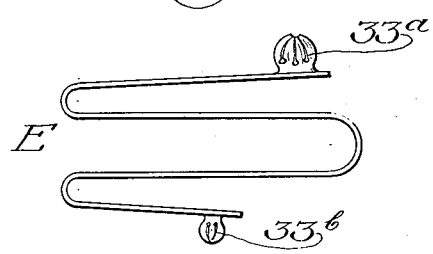
Inventor:
Charles H. Leinert.
By Banning & Banning
Attys.

Patented Mar. 10, 1925.

1,529,439

UNITED STATES PATENT OFFICE.

CHARLES H. LEINERT, OF CHICAGO, ILLINOIS, ASSIGNOR TO LEINERT VALVE COMPANY, OF CHICAGO, ILLINOIS, A CORPORATION OF ILLINOIS.

VALVE FOR COMPRESSORS.

Application filed November 9, 1921. Serial No. 513,906.

*To all whom it may concern:*

Be it known that I, CHARLES H. LEINERT, a citizen of the United States, residing at Chicago, in the county of Cook and State of Illinois, have invented certain new and useful Improvements in Valves for Compressors, of which the following is a specification.

The valve of the present invention is designed as an improvement on the construction set forth in my Letters Patent No. 1,240,461, issued September 18, 1917, and relates particularly to the form and construction of the spring members which maintain the valve disk in seated relation and permit the same to recede from its seat under spring tension when subjected to a given degree of pressure or suction. The arrangement of the springs is one which permits a ready disassembling of parts, the springs being so formed as to be snapped into and out of the socket recesses provided to receive them.

Figs. 3, 4, 5, 6, 7, and 8 are modifications in the form of attaching ends of the spring members.

The blowers of the type to which this invention particularly relates are usually employed for the discharge of relatively large volumes of air at comparatively low pressure, and such blowers are generally operated at a relatively high speed, so that the check valves controlling the inlet and discharge ports for air are also reciprocated at comparatively high speed. Owing to the conditions mentioned, the check valves are subjected to hard usage such as to cause their frequent wearing out, and necessitating their frequent renewal. It is accordingly an object of this invention to provide a check valve adapted for this kind of service which is cheap, efficient, and which may be easily and quickly repaired, or renewed whenever necessary, without shutting down operation of the compressor for any extended period.

Figure 1:
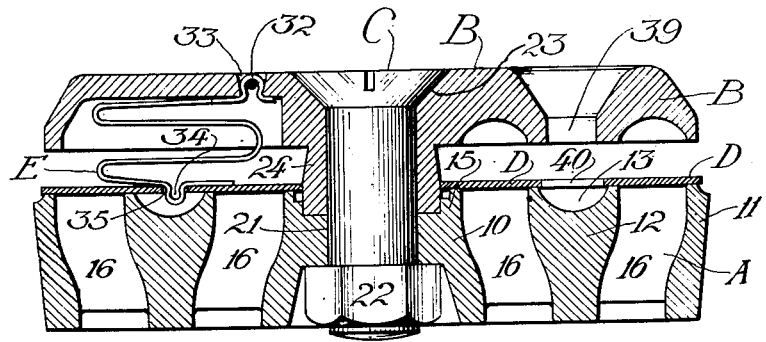
Figure 1 is a transverse section through a discharge valve embodying the features of the present invention.
Figure 2:
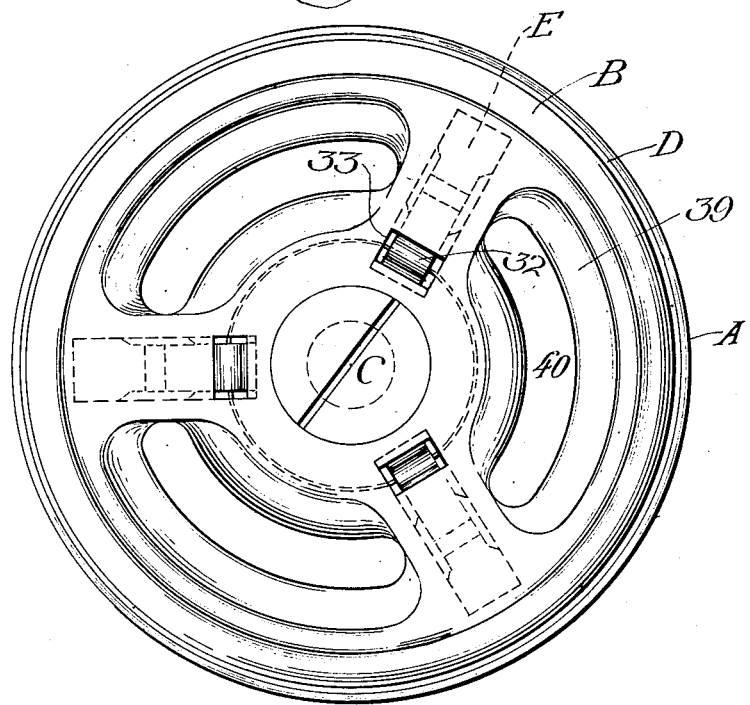
Fig. 2 is a plan thereof.

Referring now particularly to Figs. 1 and 2, I have shown therein a discharge valve which consists of a valve seat A adapted to attach directly to the compressor or to a wall surrounding the same, a stop plate B connected to the valve seat through the medium of a bolt C, a disk plate D interposed between the two members, and spring means E arranged to hold the valve disk D normally upon its seat. The parts just enumerated are the only ones which enter into the construction of this valve, but they are specially formed to co-operate with each other in a peculiar manner, all as will now be explained.

The valve seat member A which lies inwardly of the other parts is formed to provide a hub 10, a rim 11, and an intermediate circular wall 12 having in its outer face an annular groove 13. The outer face of the rim 11 also constitutes a seat for the disk D which is preferably formed of sheet metal or other suitable material. The disk is also adapted to seat upon a flange 15 formed on the hub of the valve seat, and upon the edges bordering the annular groove 13 of the wall 12, this latter part being connected to the rim and to the hub as by means of spokes 10 in a well known manner.

I provide within the hub 10 an axial bore 21 enlarged at its inner end for the purpose of receiving the bolt C whose nut 22 may be disposed within the enlarged portion of the bore in flush relation with the inner face of the valve seat. The bolt also extends through an axial opening 23 in the stop plate which is provided with a hub 24 whose end sockets within the hub 10 of the member A. The seat which is centrally apertured to receive the hub 24 is adapted to be centered in place upon the seat, but is disengaged therefrom as soon as it is lifted from off its seat.

The subject matter of the present invention resides particularly in the spring means which is interposed between the stop plate and the valve disk, and also in the connection which obtains between such means and the associated parts. As shown, the spring means may take the form of a plurality of leaf springs, each of M-shape or zigzag formation, so as to provide an upper leaf section which terminates in a head 32. If desired, the material forming this head may be so bent as to provide in effect a pair of reversed bows (see Fig. 1) having adjacent thereto a throat or neck which is slightly contracted. Owing to the material of which such a head is formed, these bows may, when necessary, yield to an outward pressure, the result being that if the head be confined within an aperture of proper size, it will be securely held therein. The lower leaf section of each spring may likewise be formed adjacent its extremity with a spring head 34 having similar characteristics. A spring so formed at either or both of its ends is adapted to co-operate with suitable sockets or recesses formed in the stop plate, or valve disk, or both. As shown in Fig. 1, such a recess 33 is provided in the stop plate and may be so formed as to present tapering walls adjacent which the spring head 32 is engaged. With such a construction the spring head may be compressed slightly during the process of its insertion within the socket 33, but, when positioned therein, it provides a firm, yet detachable, connection between the spring and the stop plate. A socket or opening 35 may be similarly provided in the valve disk so as to receive the spring head 34, but owing to the thin character of the disk, the walls of such a socket would normally be parallel.

By forming in one or both of these parts suitable sockets or recesses, with which the proximate head of the spring may co-operate, I am able to provide a convenient form of snap lock which will be sufficiently secure for all practical purposes. In the event that the valve be disassembled, the several springs may be removed, together with one or both of the associated parts wherewith they are snap-locked in the manner described, thus permitting the handling of such parts as a unit. It will be understood, of course, that a sufficient number of leaf springs, each by preference alike, are interposed between the stop plate and valve disk to provide a desirable balanced pressure. Also, a wire ring 36 may, if desired, be threaded through the several spring heads to assist in holding them in place, although ordinarily the frictional engagement of the spring metal against the socket walls will be sufficient for this purpose.

The formation of the spring heads which engage with the stop plate and the valve disk may be modified in various ways, as indicated in Figs. 3, 4, 5, and 6 which merely illustrate various methods of bending or configuring the metal to afford the necessary spring action, but in each case it will be observed that the formation is such as to require a forcing and contraction of the spring head in order to fit it within the socket provided therefor.

Figs. 7 and 8 show a slight modification in structure in which the spring heads 33ª and 33ᵇ each form a spherical boss or protuberance which is radially slotted after the manner of a glove fastener, so that the segmental sections thereof, when subjected to compression, will be slightly contracted from all directions toward the center, thereby allowing the enlarged head of the boss to be forced through into the socket opening and slightly expanded when the parts are fully positioned.

The transverse and longitudinal configuration of the spring is relatively unimportant it being merely essential that suitable spring material be used, and that it be properly bent to provide a spring action which tends normally to hold the valve disk upon its seat.

The stop plate is provided with openings 39 permitting the discharge of air that first passes through arc-shaped openings 40 in the disk when the latter is lifted off of its seat against the tension of the springs E. It will be noted that the disk is centered upon its seat by means of the tapered walls of the sleeve 24, but this centering action takes place only when the plate has approached closely to the seat. In any other position the plate is free of contact with the sleeve 24 so as to be unrestricted in its movements.

It is obvious, of course, that in respect to details of construction the present valve may take other forms than the ones herein shown and described, without sacrifice of the advantages and features of utility which characterize this invention, and accordingly I desire that any such modifications should be included with the scope of this patent, as defined by the claims following.

I claim:

1. In a valve of the kind described, the combination of a seat, a stop plate connected therewith in spaced relation, a valve disk co-acting with the seat, and an interposed spring provided with spring heads, the stop plate and valve disk being provided with sockets adapted to receive the spring heads and have the same entered thereinto under spring tension, substantially as described.

2. In a valve of the kind described, the combination of a seat, a stop plate connected therewith in spaced relation, a valve disk co-acting with the seat, and an interposed spring provided with spring heads, the stop plate and valve disk being provided with sockets adapted to receive the spring heads and have the same entered thereinto under spring tension, the spring heads being normally expanded to a greater degree than the throat dimensions of the sockets, substantially as described.

3. In a valve of the class described, the combination of a seat, a stop plate secured thereto in spaced relation therewith, a valve disk co-acting with the seat, and a zigzag spring member interposed between the valve disk and the stop plate and being provided with outwardly bowed spring heads, the stop plate and the valve disk being provided with socket recesses adapted to receive the spring heads, substantially as described.

4. In a valve of the class described, the combination of a seat, a stop plate secured thereto in spaced relation therewith, a valve disk co-acting with the seat, and a zigzag spring member interposed between the valve disk and the stop plate and being provided with outwardly bowed spring heads, the stop plate and the valve disk being provided with socket recesses adapted to receive the spring heads, the spring heads being normally expanded to a greater degree than the throat dimensions of the sockets, substantially as described.

5. In a valve of the kind described, the combination of a seat, a stop plate connected therewith in spaced relation, a valve disk co-acting with the seat, and an interposed spring provided with spring heads, the stop plate and valve disk being provided with sockets adapted to receive the spring heads and have the same entered thereinto under the spring tension of said spring heads, substantially as described.

6. In a valve of the kind described, the combination of a seat, a stop plate connected therewith in spaced relation, a valve disk co-acting with the seat, and spring means interposed between the valve disk and stop plate having a formation adjacent the disk such as to snap-lock therewith, substantially as described.

7. In a valve of the kind described, the combination of a seat, a stop plate connected therewith in spaced relation, a valve disk co-acting with the seat, and a spring interposed between the valve disk and stop plate having one end so formed as to snap-lock with the part proximate thereto, substantially as described.

8. In a valve of the kind described, the combination of a seat, a stop plate connected therewith in spaced relation, a valve disk co-acting with the seat, and a spring interposed between the valve disk and stop plate having a portion of itself extended through each of these parts to yieldingly engage the same, substantially as described.

9. In a valve of the kind described, the combination of a seat, disk, spring, and stop plate assembled together in the order named, the spring and one of its associated parts being cooperatively formed to provide therebetween a snap-lock, substantially as described.

10. In a valve of the kind described, the combination of a seat, disk, spring, and stop plate assembled together in the order named, there being in one of the parts associated with the spring a recess, the spring being formed with a head fitting tightly within said recess in a manner to exert pressure against opposite sides thereof, substantially as described.

CHARLES H. LEINERT.